United States Patent [19]

Nomura et al.

[11] 4,267,427

[45] May 12, 1981

[54] METHOD OF BORING A HOLE THROUGH A MAGNET MADE OF AN INTERMETALLIC COMPOUND

[75] Inventors: Hiroki Nomura; Masao Mafune, both of Kawagoe; Masaru Koyanagi, Niiza, all of Japan

[73] Assignee: Citizen Watch Co., Ltd., Tokyo, Japan

[21] Appl. No.: 970,951

[22] Filed: Dec. 19, 1978

[30] Foreign Application Priority Data

Dec. 27, 1977 [JP] Japan .............................. 52-156431
Mar. 8, 1978 [JP] Japan .............................. 53-026228
Mar. 11, 1978 [JP] Japan .............................. 53-027957
Mar. 31, 1978 [JP] Japan .............................. 53-037630

[51] Int. Cl.³ .............................................. B23K 27/00
[52] U.S. Cl. ................................ 219/121 LL; 29/607; 219/121 LK
[58] Field of Search ............... 29/602 R, 607, 603; 148/9 R; 219/121 L, 121 LK, 121 LL, 121 LM, 121 LC, 121 EH, 121 EB, 121 EM

[56] References Cited

U.S. PATENT DOCUMENTS

| 3,784,945 | 1/1974 | Baermann | 335/302 |
| 3,874,075 | 4/1975 | Lohse | 29/602 |
| 3,955,921 | 5/1976 | Tensmeyer | 219/121 LM X |
| 4,017,965 | 4/1977 | Brutsch | 29/603 |
| 4,092,515 | 5/1978 | Joslin et al. | 219/121 LM |

OTHER PUBLICATIONS

Klauser et al., *IBM Technical Disclosure Bulletin,* "Laser Hole", Drilling in Epoxy Glass, vol. 9, No. 4, Sep. 1976, p. 1180.

Lorenz et al., *IBM Technical Disclosure Bulletin,* "Laser Drilled Holes in Vitreous Carbon", vol. 16, No. 8, Jan. 1974, p. 2752.

Balan et al., *IBM Technical Disclosure Bulletin,* "Laser Drilling", vol. 17, No. 3, Aug. 1974, p. 779.

Mainong et al., *IBM Technical Disclosure Bulletin,* "Laminate Fabrication to Facilitate Laser Hole Drilling", vol. 17, No. 8, Jan. 1975, p. 2258.

*Primary Examiner*—C. L. Albritton
*Attorney, Agent, or Firm*—Jordan and Hamburg

[57] ABSTRACT

A method of boring a hole through a magnet made of an intermetallic compound, characterized in that the hole is formed by a laser machining. The magnet may be reinforced by impregnation with a nonmagnetic material such as a high polymeric substance or a metal having a low melting point before the hole is bored through the magnet by laser machining.

7 Claims, 5 Drawing Figures

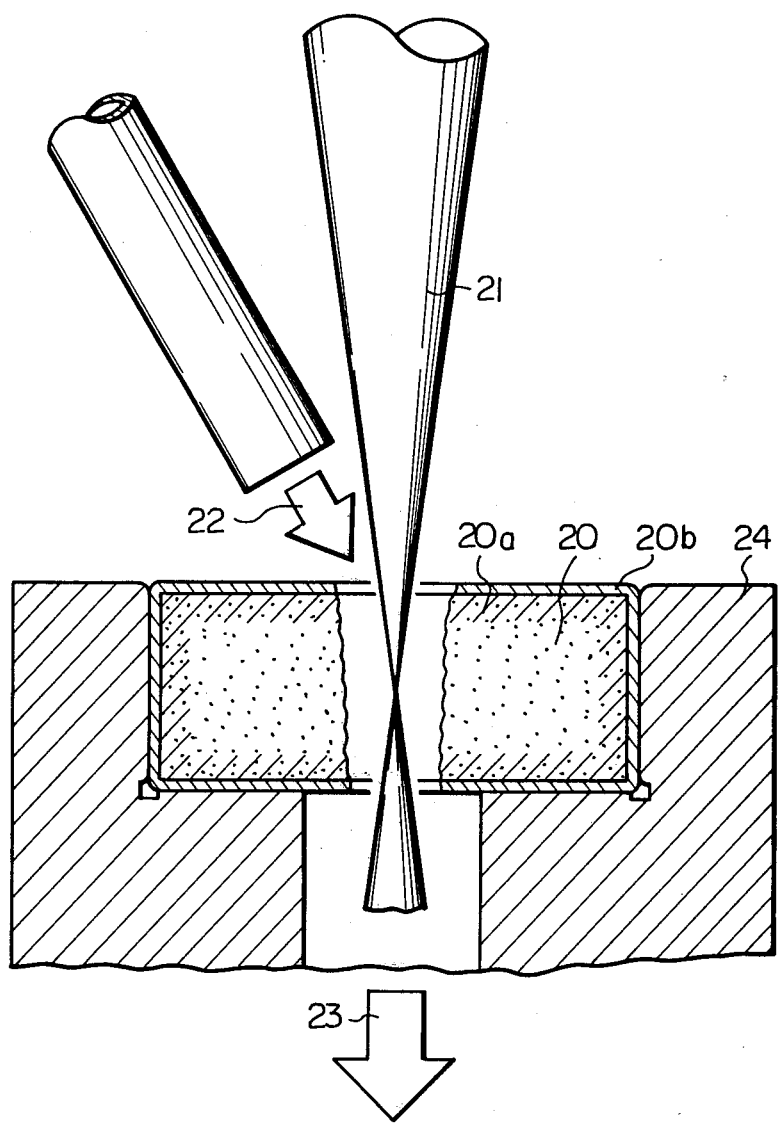

METHOD OF BORING A HOLE THROUGH A MAGNET MADE OF AN INTERMETALLIC COMPOUND

This invention relates to a method of boring a hole in a magnet made of an intermetallic compound such as a compound of cobalt and a rare earth element.

Since such a magnet constitutes a permanent magnetic material of a high performance, magnetic circuits can be made small in size and light in weight. Owing to these advantages, magnets of this type are now beginning to be employed in a variety of electronic fields. For example, a stepping motor rotor magnet used in timepieces must be thin and compact, light in weight, high in performance and capable of being machined at low cost. To meet these requirements efforts have been made to minimize the size and weight of rotor magnets made of a rare earth element cobalt compound which exhibits a strong coercive force, a high residual magnetic flux density and maximum energy product. Since the properties of such rotor magnets are closely related to the weight of the magnet, the more the size of the magnet is reduced the greater the requirement for more stringent machining precision.

Conventional methods of boring a hole through the center of a rotor magnet to allow the insertion of a rotor shaft have a number of difficulties. According to one such method, preliminary boring is accomplished by electro arc machining followed by a finishing process by means of grinding to form the completed bore. Another method is similar to the boring of a ruby to be used as a bearing in a timepiece. Namely, preliminary boring is carried out by rotating both a diamond drill and the magnet to form a deep cut in the magnet, after which grinding powder in the form of a paste is used in a lapping step to complete the bore formation.

FIG. 1 is a cross-sectional view showing a preliminary boring procedure according to the conventional electro arc machining method. Reference numeral 10 denotes a magnet, 12 a machining electrode, 13 a machining liquid and 14 a layer which undergoes a change in properties owing to machining. In the preliminary boring of the magnet according to this electro arc machining method, the boring of, for example, a 0.5 mm$\phi$ diameter hole in a samarium cobalt magnet having a thickness of 0.5 mm requires a lengthy machining period of from 30 seconds to one minute. The heat produced by this prolonged machining period results in a thicker layer 14 of altered properties. These disadvantages make it necessary to expend a large amount of time for the finishing step and they also tend to degrade the properties of the magnet. In addition, the use of machining oil for the electro arc process makes it difficult to achieve automation and carry out post-processing.

FIG. 2 is a cross-sectional view showing a preliminary boring procedure according to a conventional drilling method using a diamond drill. Reference numeral 15 denotes a magnet, 16 a diamond drill, 17 a drilling liquid and 18 a chuck. One disadvantage of this method is that the diamond drill causes the periphery of the bore to crumble. Another is that in boring a hole through a magnet consisting of the same material and having the same dimensions as that of the abovementioned magnet machined by the electro arc method, the hole produced by the diamond drill is caused to taper outwardly toward each end, acquiring a 0.7 mm$\phi$ diameter at its extremities and a 0.5 mm$\phi$ diameter at its central portion. This makes it extremely difficult to meet the requirements for smaller magnets.

Not only is the machining time a lengthy 45 seconds to 1 minute, but the consumption of expensive diamond drills also raises machining costs. When machining a high performance magnet the break down of the bore periphery due to the diamond drill preliminary boring step is extensive. There are thus many cases in which these flaws remain on the bore surface even after a finishing treatment by lapping. This lowers yield to less than 50% and makes production control and management a major problem.

It is therefore an object of the present invention to provide a boring method which overcomes the abovementioned shortcomings encountered in the prior art.

In the accompanying drawings, in which:

FIG. 3 is a cross-sectional view of a preliminary boring process according to a laser beam machining method;

Figure 1:
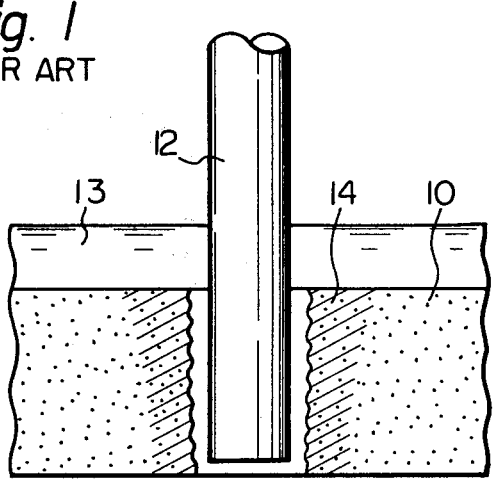
FIG. 1 is a cross-sectional view of a preliminary boring process according to a conventional electro arc machining method.
Figure 2:
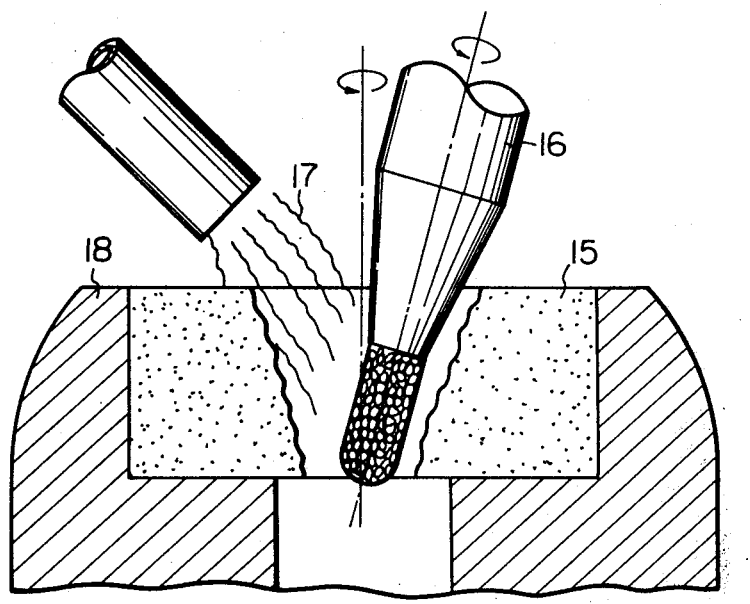
FIG. 2 is a cross-sectional view of a preliminary boring process according to a conventional diamond drilling method.
Figure 4A:
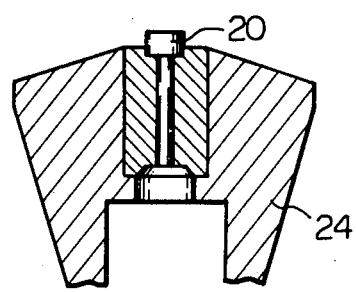
FIGS. 4a and 4b are simplified sectional and plan views of a magnet being grasped by a hydrostatic chuck.
Figure 4B:
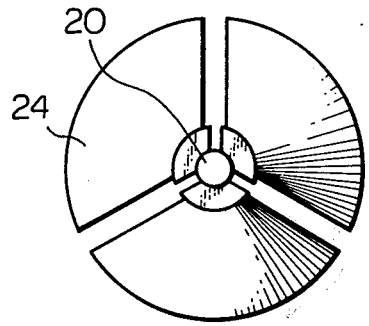

A detailed description of the present invention will now be had with reference to FIG. 3 which is a cross-sectional view illustrating a process for the preliminary boring of a hole through a magnet according to a method embodying the present invention. FIG. 4 is a simplified view of a magnet 20 being grasped by a chuck 24 which applies hydrostatic pressure. In the present invention, hydrostatic pressure will be taken to mean pressure applied from the surface of the magnet to its interior.

Referring now to FIG. 3, peripheral portions of a magnet 20 is vacuum impregnated beforehand with a non-magnetic material such as resin which has been allowed to harden. This forms a resin impregnated or reinforced region 20a indicated by the shaded area in the drawings. Furthermore, a metal having a low melting point or a nonmagnetic material such as a high polymeric substance incorporating a reinforcing material selected from the group consisting of alumina powder, glass powder, fibers and pigments, is coated onto the surface of magnet 20 to form a protective layer film 20b. Reference numeral 21 denotes a laser beam. Designated at 22 is a jet of compressed air for removing scattered particles of the magnet during machining, and at 23 a vacuum suction also for removing scattered particles. At the time of the laser machining step, magnet 20 is grasped from the outside by a chuck 24 which applies hydrostatic pressure to prevent the magnet from cracking or fissuring. The actual machining procedure is as follows.

First, a hole having a diameter of from 0.3 to 0.5 mm$\phi$ is instantaneously bored through the magnet by laser beam machining. However, since the impact force of the laser beam is large, it is necessary to conduct the machining carefully for there are occasions where the periphery of the bore cracks and fissures when attempting to instantaneously bore a hole having a diameter greater than 0.3 mm$\phi$. To prevent this cracking, prior to machining the magnet is impregnated with the high polymeric material such as resin, and a protective film consisting of alumina powder, glass powder, fibers or pigments admixed with resin is formed on the surface of the magnet by coating or printing and is then allowed to dry and harden to reinforce the magnet. Good results are obtained when using a laser beam to bore a hole in a magnet grasped and held from the outside under hydrostatic pressure by means of a chuck or keep plates. The provision of the protective coating simplifies post-processing since substances which are melted and scattered by the heat and impact of the laser beam do not adhere to the surface of the magnet to lower its quality. After the preliminary boring step using the laser, the hole is ground or drilled to complete the procedure.

Although various lasers such as gas lasers and solid lasers exist, the solid laser is the most effective for boring a hole in a magnet. The laser conditions for practising a first embodiment are as follows. A pulsed oscillation type of laser machining is used. To bore a hole having a diameter of from 0.1 to 0.5 mm$\phi$, the following conditions were found to be effective:

laser pulse width: 0.2 to 0.8 mS;
  pulse interval: 3 to 5 pps;
  pulse number (the number of pulses required to completely bore 1 hole): 1 to 10;
  voltage: 0.8 to 2 KV;
  focal length: 20 to 150 mm; and
  energy per pulse: 1 to 2 J.

The laser conditions for practising a method are as follows. A Q-switch oscillation type of machining is used. In this case, the following conditions were found to be effective:

pulse width: 100 to 200 mS;
  repeating frequency: 5 to 7 KHz;
  voltage: 100 to 200 V;
  electric current: 10 to 20 A;
  focal length: 20 to 150 mm;
  average power: 23 KW; and
  power per pulse: 25 KW.

Since the hole diameter which can be machined by a Q-switch oscillation system is small, i.e., on the order of 0.06 to 0.12 mm$\phi$, it is necessary to machine the magnet by rotating the magnet so as to off-set the position of the laser beam focal point from the center of the hole by a distance equal to the radius of the hole.

It was found that the impregnation and coating of the high polymeric material as well as the gripping of the magnet by means of hydrostatic force were extremely effective in preventing carcking and fissuring due to impact force and vibration. A metal having a low melting point is also effective as the material used to impregnate or coat the magnet.

Figure 5:
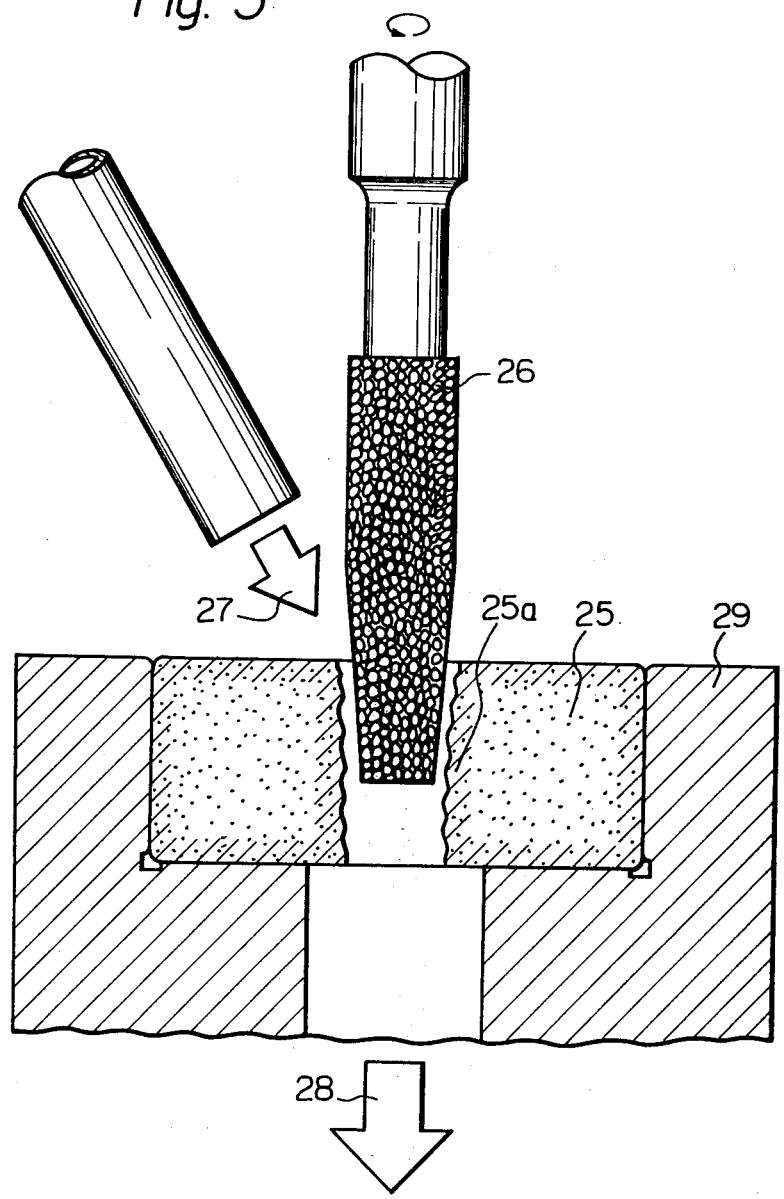
FIG. 5 is a cross-sectional view of a hole finishing process according to the present invention.

FIG. 5 is a cross-sectional view of another process embodying the present invention for the finishing of a hole which has been bored through a magnet. The machined periphery of a hole preliminarily bored through a magnet 25 is impregnated or coated with a metal having a low melting point or with a high polymeric substance such as resin, paint, varnish or a bonding agent to form a protective reinforcing layer 25a. Reference numeral 26 denotes a tapered grind stone, 27 a jet of compressed air for removing scattered particles of the magnet during machining, and 28 a vacuum suction also for removing the scattered particles. At the time of the grinding step, magnet 25 is grasped from the outside by a chuck 29 which applies hydrostatic pressure to prevent the magnet from cracking or fissuring.

It was found that a small round hole having a diameter of from 0.2 to 1 mm$\phi$ could be machined at a high degree of precision if the hole was polished using an electrodeposited diamond grind stone rotated by an air turbine motor at a high speed of 100,000 to 250,000 rpm. A #600 to #1500 grind stone is preferred. To produce a hole having an irregular shape it is possible to move either the workpiece itself or the shaft of the circular grind stone while the grind stone is being rotated. It was found that good precision could be obtained by machining the hole using an irregularly shaped tool vibrated at supersonic frequency. The same precision can of course be obtained by finishing the hole using a circular tool vibrated at normal frequencies.

What is claimed is:

1. A method of forming a hole through a magnet made of an intermetallic compound, comprising the steps of impregnating the magnet with a nonmagnetic material of a metal having low melting point to form a reinforced region at peripheral portions of the magnet, and laser machining said magnet to form said hole.

2. A method as claimed in claim 1, in which said nonmagnetic material is a resin.

3. A method of forming a hole through a magnet made of an intermetallic compound, comprising the steps of laser machining said magnet to form said hole, and providing a surface of said magnet with a protective film of a nonmagnetic material comprising a high polymeric substance.

4. A method as claimed in claim 3, in which said nonmagnetic material of said protective film further comprises a reinforcing material selected from the group consisting of alumina powder, glass powder, fibers and pigments.

5. A method as claimed in claim 3, in which said nonmagnetic material of said protective film comprises a metal having a low melting point.

6. A method of forming a hole through a magnet made of an intermetallic compound, comprising the steps of preliminarily forming a bore in said magnet, impregnating said magnet with a nonmagnetic material to form a reinforced region at peripheral portions of said magnet, and laser machining said magnet to form said hole.

7. A method of forming a hole through a magnet made of an intermetallic compound, comprising the steps of laser machining said magnet to form said hole, said magnet being grasped from the outside by grasping means and held under the application of hydrostatic pressure, and said magnet being subjected to laser machining under the following laser conditions:
  (a) laser type: solid laser;
  (b) method of oscillation: pulsed oscillation;
  (c) pulse width: 0.2 to 0.8 mS;
  (d) pulse interval: 3 to 5 pps; and
  (e) pulse number: 1 to 10 pulses.

* * * * *